United States Patent Office 3,084,774
Patented Apr. 9, 1963

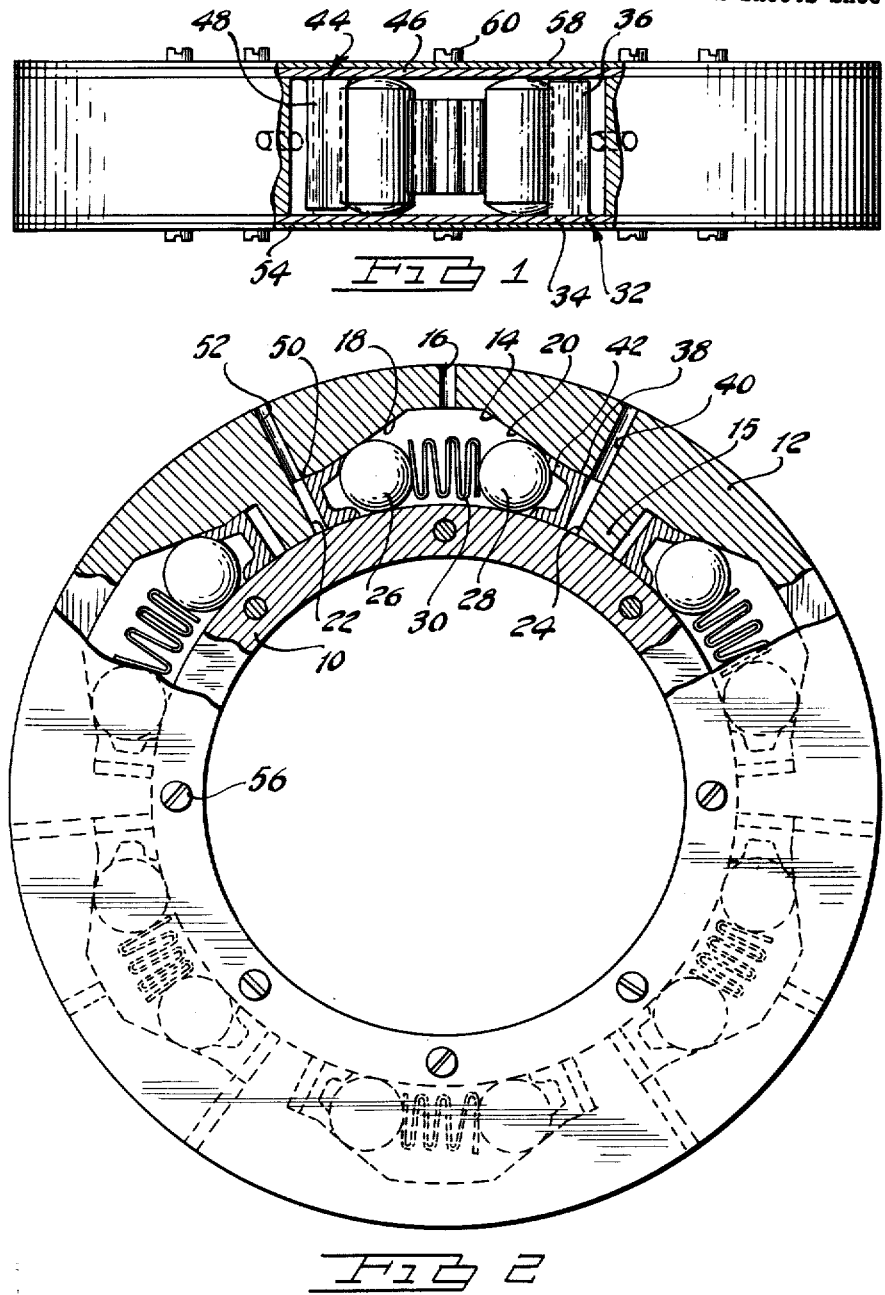

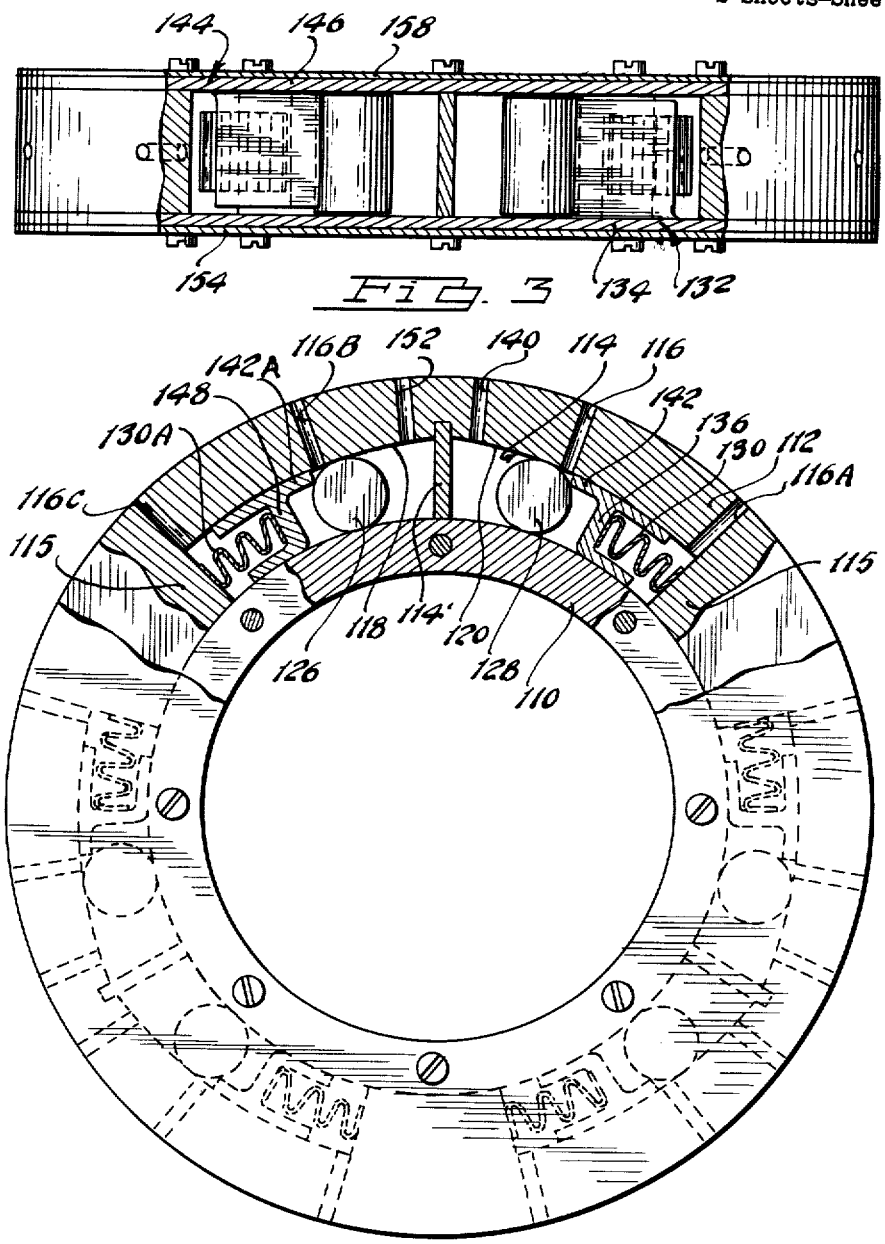

3,084,774
TWO-WAY OVERRUNNING COUPLING
Po-lung Liang, Lincoln Park, Mich., assignor to Ford Motor Company, Dearborn, Mich., a corporation of Delaware
Filed June 24, 1960, Ser. No. 38,499
9 Claims. (Cl. 192—44)

My invention relates generally to torque transmitting couplings, and more particularly to overrunning clutches or brakes in which the clutching or braking action can be controlled by means of fluid pressure operated components.

My improved coupling is suited particularly for use with geared, multiple speed power transmitting mechanisms for controlling the relative motion of the gear elements thereof. The coupling can be conditioned for transferring reaction torque from the various gear elements to the transmission casing or for transferring driving torque from one element of the torque delivery path to another. Transmission speed ratio changes can be accomplished in this fashion.

According to a principal feature of one embodiment of my invention, a plurality of rollers is disposed between inner and outer coupling races. One of the races is formed wtih cammed surfaces that cooperate with the rollers to establish a camming action. A driving connection between the races is thereby formed. Each race is connected to separate portions of the transmission mechanism so that the relative speed ratio therebetween can be controlled.

The rollers may be urged normally into camming engagement with their respective cam surfaces. In order to release the rollers, a phasing ring is employed. This phasing ring includes piston members on which pawls are formed, said pawls being engageable with the rollers. The phasing ring is rotated under the influence of fluid pressure to release simultaneously each of the rollers. The fluid pressure therefore acts on the phasing ring at spaced locations about the periphery of the coupling, and the resultant fluid pressure forces are thereby cumulative. If one of the plurality of rollers should require a greater releasing force than the others, the necessary fluid pressure force acting on the phasing ring is available to effect disengagement of the same.

In a copending application, Serial No. 39,701 which is assigned to the assignee of my instant invention, there is disclosed a roller coupling wherein the coupling rollers function as pistons, and the recesses in the race in which the rollers are situated function as servo cylinders. When the fluid pressure chambers defined by the rollers and the recesses is pressurized, the individual rollers are released thereby interrupting the clutching action. The pressure which is required for this purpose is equal to that pressure which is necessary to disengage the roller with the highest degree of camming action.

Further, since some of the rollers may be retained more loosely in place than others, they will become released at a relatively low pressure. Once they are so released, the pressure chamber associated therewith is brought into fluid communication with the exhaust region. This may prevent a further pressure build-up to that value which is required to disengage the other rollers that are subjected to a high degree of camming action. This condition may result in a delayed release of the coupling, or the coupling possibly may fail to release under high driving torque conditions.

The provision of an improved coupling construction of the type set forth being a principal object of my invention, it is a further object of my invention to provide a roller coupling in which means are provided for releasing simultaneously the coupling rollers under the influence of fluid pressure.

It is a further object of my invention to provide a coupling of the type set forth in the preceding object wherein phasing rings are situated in concentric relationship wtih respect to the coupling races, and wherein portions of the phasing rings cooperate with the races to define a plurality of pressure chambers which may be pressurized selectively to effect a simultaneous disengagement of each of the rollers of the coupling.

It is a further object of my invention to provide a roller coupling assembly of simplified construction for use in a power transmission mechanism for regulating the relative motion of the gear elements thereof, said coupling being characterized by a high degree of reliability and a relatively high clutching capacity.

It is a further object of my invention to provide a coupling of the type above set forth wherein the space requirements of the coupling are of a relatively reduced order of magnitude in comparison to friction transmission clutches or brakes of known construction.

It is a further object of my invention to provide a roller coupling having a plurality of rollers situated at spaced intervals about the periphery of the coupling, and wherein means are provided for effecting a uniform distribution of forces in the rollers.

Further objects and features of my improved coupling construction will become apparent from the following particular description and from the accompanying drawings wherein:

FIGURE 1 shows a plan view, partly in section, of a roller coupling embodying the improvements of my invention;

FIGURE 2 is a side view, partly in section of the coupling of FIGURE 1;

FIGURE 3 is a plan view, partly in section, of a second embodiment of our invention; and, FIGURE 4 is a side view, partly in section, of the coupling of FIGURE 3.

Referring first to the embodiment of FIGURES 1 and 2, numeral 10 designates a circular inner race and numeral 12 designates a circular outer race, said races being situated in concentric disposition. The outer race 12 is formed with a plurality of recesses 14 which are situated at spaced intervals about the axis of the races 10 and 12.

Each of the recesses 14 is formed with a central region of relatively large volume. An exhaust passage 16 communicates with this central region.

Each recess 14 further defines a pair of cam surfaces, as shown at 18 and 20, and a pair of tangentially disposed pressure chamber regions 22 and 24. The cam surface 18 is situated between the region 22 and the central region of recess 14, and the cam surface 20 is situated between region 24 and the central region of recess 14. The regions 22 and 24 are each defined in part by a pair of concentrically disposed surfaces, one of which is coincident with the outer periphery of the inner coupling race 10.

A pair of rollers 26 and 28 is positioned within recess 14, said rollers being spring urged in opposite directions by means of a convoluted leaf spring 30. Roller 26 is engageable with cam surface 18, and roller 28 is engageable with cam surface 20. The axes of the rollers 26 and 28 are situated in parallel disposition with respect to the axis of the coupling.

The first phasing ring is identified in FIGURE 1 by reference character 32, and it includes a side plate 34 that is situated on one side of the coupling race 12. Plate 34 covers one end of the recess 14, thereby partially enclosing the same.

Roller actuator piston portions 36 are carried by plate 34, and one such piston portion 36 extends axially into each of the recesses 14 on one side of the associated roller 28. Each actuator portion 36 is formed with a circular inner surface that conforms in shape to the contour of the outer surface of the inner race 10. The actuator portions 36 further include sealing surfaces 38 situated radially outward from the inner circular sealing surfaces thereof. Surfaces 38 slidably engage the cooperating surfaces of the chamber regions 24. Actuator portions 36 therefore cooperate with chamber regions 24 to define fluid pressure chambers. These chambers communicate with pressure passages 40 which extend in a radially outward direction.

Each actuator portion 36 further includes a finger or pawl 42 that is engageable with the adjacent roller 28. When the region 24 is pressurized, the actuator portion 36 will be moved in a counterclockwise direction as seen in FIGURE 2, and the pawl 42 will therefore move the roller 28 out of camming engagement with the cam surface 20 against the opposing force of the spring 30.

In a similar fashion, a second phasing ring is situated on the opposite side of the coupling, and it is identified in FIGURE 1 by reference character 44. This phasing ring 44 includes a plate 46 situated adjacent the outer race 12 so that it partially encloses recess 14. The plate 46 also has connected thereto a roller actuator or piston portion 48 that is similar in form to the above described piston portion 36 of the phasing ring 22. Piston portion 48 has a curved inner surface which sealingly engages the outer surface of the inner race 10, and it is also formed with an outer sealing surface 50 that is concentrically disposed with respect to the outer surface of race 10. The piston portion 48 therefore cooperates with region 22 to define a pressure chamber, and this chamber is in fluid communication with another pressure passage 52.

Piston portion 48 also includes a pawl that engages the cooperating roller 26, and when the pressure chamber defined by the piston portion 48 and the region 22 is pressurized, the roller 26 is moved out of camming engagement with cam surface 18 against the opposing force of spring 30. When the region 22 is pressurized, the actuator portion 48 and the plate 46 are moved in a clockwise direction as viewed in FIGURE 2. Relative sliding motion between plate 46 and the axial end of race 12 can be accommodated. Suitable clearances are provided for this purpose. Similarly, relative sliding motion between plate 34 and the other axial end of outer race 12 may take place when the region 24 is pressurized.

A cover plate 54 is secured to one axial side of the inner race 10, suitable bolts or screws 56 being provided for this purpose. The plate 54 extends radially outward in overlapping relationship with respect to plate 34 of the phasing ring 32. Similarly, a cover plate 58 is secured to the other axial end of the inner race 10, suitable bolts 60 being provided for this purpose. The plate 58 extends radially outward in overlapping relationship with respect to the plate 46 of the phasing ring 44. The plates 54 and 58 serve as sealing members to prevent excessive leakage of fluid when either of the regions 22 or 24 is pressurized.

The other recesses in the outer race 12 are similar in form to that which is above described, and each of these recesses has a pair of rollers which are situated in camming engagement with the cooperating cam surfaces defined by the recesses 14. It is thus apparent that the coupling mechanism of FIGURES 1 and 2 is capable of inhibiting relative rotation between races 10 and 12 in either direction. Relative overrunning motion of race 10 in a clockwise direction relative to race 12 can be accommodated, however, by pressurizing the region 24 to disengage roller 28. Similarly, overrunning motion in the opposite direction is accommodated when the region 22 is pressurized. The coupling mechanism can therefore function as a brake for accommodating reaction torque in a power transmission mechanism in either direction.

The portions 15 of the outer race between the recess cooperate with the inner race so that one face can be piloted with respect to the other. The bearing surface of portions 15 also serve as fluid pressure seals.

The coupling mechanism of FIGURES 1 and 2 can be incorporated in a power transmission mechanism in combination with a planetary gear system, and the outer race 12 can be located in the relatively stationary transmission casing. The ports 16, 40 and 52 can be arranged to communicate with internal passage structure formed in the transmission casing so that fluid pressure may be distributed to the regions 22 and 24. Passage 16 is open to a low pressure exhaust region. Suitable control valve means may be used for selectively pressurizing passages 52 and 40 during a shift sequence. Relative motion between the gear elements of the transmission mechanism can be controlled in this fashion so that a speed ratio shift from one ratio to another can be accomplished.

Referring next to FIGURES 3 and 4, we have illustrated another embodiment of my invention. The embodiment of FIGURES 3 and 4 is also capable of providing a clutching action in either direction of rotation, and fluid pressure operated phasing rings are used to overrule the clutching action of the clutch rollers to permit overrunning motion in either direction as desired. The coupling of FIGURES 3 and 4 differs, however, from the coupling of FIGURES 1 and 2 in that the clutching action is obtained by reason of the biasing force of the coupling springs and the coupling is disengaged by fluid pressure forces.

The inner race of the coupling in FIGURES 3 and 4 is designated by reference character 110, and the outer race is shown at 112.

The outer race 12 is formed with an elongated recess 114 situated between two pilot portions 115. The pilot portions 115 form bearing surfaces that engage the outer surface of the inner race 110 and maintain the latter in concentric relationship with respect to the outer race 112.

The recess 114 is provided with a separator plate 114' which divides the recess 114 into two similar parts, each part defining a cam surface. The cam surface associated with one recess part is shown at 120 and the cam surface associated with the other recess part is shown at 118. A first roller 128 is situated in recess 14 and it is adapted to engage the cam surface 120. Similarly, a roller 126 is situated in the recess 114 on the left-hand side of the separator plate 114', and it is situated in camming engagement with cam surface 118.

A pressure passage 140 is formed in race 112 and it extends to the recess 114 on the left-hand side of roller 128 as viewed in FIGURE 4. Similarly, another pressure passage 152 is formed in the race 112, and it communicates with recess 114 on the right-hand side of roller 126 as viewed in FIGURE 4. Passages 140 and 152 may be selectively pressurized in order to establish a camming action between the rollers 126 and 128 with respect to the inner and outer races 110 and 112. When this occurs, relative rotation between the races in either one direction or the other is inhibited.

A first phasing ring is shown in FIGURE 3 at 132, and it includes a side plate 134 that is positioned on one axial side of the outer race 112 so that it partially closes the recess 114. Plate 134 has secured thereto a roller actuator piston portion 136 that extends within the recess 114 on the right-hand side of roller 128, as indicated in FIGURE 4. Piston portion 136 is formed with a first sealing surface that is coincident with the outer surface of the inner race 110. It is also formed with an outer sealing surface having a curvature that is concentric with respect to the inner sealing surface and with the outer surface of the inner race 110. A cooperating concentric surface is formed in the recess 114.

The piston portion 136 is formed with a pawl 142 which engages roller 128. Further, piston portion 136 is urged in a counterclockwise direction by spring 130 which is situated between pilot portion 115 and piston portion 136.

The plate 134 of the phasing ring 132 is adapted to move relative to the outer race 112 as the piston portion 136 is urged in a counterclockwise direction by spring 130.

The right-hand side of the roller 128, as viewed in FIGURE 4, and the right-hand side of the piston portion 136, as viewed in FIGURE 4, communicate with passages 116 and 116A, respectively, the former being an exhaust passage and the latter being a pressure passage. Passage 116A can be pressurized to assist in releasing the clutch under load.

The portion of the recess 114 on the left-hand side of the separator plate 114' has received therein a roller actuator piston portion 148 which is similar in form to the piston portion 136. The radially inward surface of the piston portion 148 has a curvature which is similar to the curvature of the surface of the outer race 110, thereby forming a fluid seal. Similarly, the outer surface of the portion 148 is formed with a curvature, and the center of the curvature of this surface is coincident with the center of curvature of the inner sealing surface of recess 114.

A spring 130A is situated between one of the pilot portions 115 and the piston portion 148, thereby urging the latter in a clockwise direction, as viewed in FIGURE 4. A pawl 142A on the portion 148 engages roller 126 when the portion 148 is urged in a clockwise direction, and this causes the roller 126 to normally move out of camming engagement with the cam surface 118. The clutch can be disengaged under load by pressurizing passage 116C which communicates with the left-hand side of piston portion 148.

The left-hand side of roller 126, as viewed in FIGURE 4, is open to the exhaust region through a suitable exhaust passage 116B. Another pressure passage 152 communicates with the right-hand side of roller 126.

This actuator portion 148 is carried by a plate 146 that defines in part a phasing ring 144. The plate 146 is situated on one side of the outer race, 112, and it partially encloses the recess 114. Sealing plates 154 and 158 are secured to the inner race 110 on either axial side thereof and they overlap the outer race and the phasing ring plates 134 and 146, respectively.

By preference the ends of the rollers 128 and 126 are formed with flat ends which sealingly engage the plates for the phasing rings. These rollers, the plates for the phasing rings and the separator plate 114 define a pair of pressure chambers which may be selectively pressurized by controlling the distribution of fluid pressure to passages 140 and 152. Roller 126 can be released under load by pressurizing passage 116C.

The coupling construction of FIGURES 3 and 4 includes two other recesses 114 situated at 120 degree intervals. A pair of clutch rollers and phasing ring piston portions are disposed in each recess in the manner above described.

Having thus described certain preferred embodiments of my invention, what I claim and desire to secure by United States Letters Patent is:

1. An overrunnning coupling comprising concentric cylindrical inner and outer races, a recess formed in one of said races, a pair of cam surfaces defined by said recess, a pair of rollers disposed in each recess, one roller being adapted to engage each cam surface, a pair of phasing rings, one phasing ring being disposed on each axial side of said one race, a piston member carried by each phasing ring, the piston member for one phasing ring extending into said recess adjacent one of the associated rollers, the piston member for the other phasing ring extending into said recess on one side of the other associated roller, a roller engaging pawl carried by each piston member, each of said piston members and said recesses cooperating to define a pair of pressure chambers, and passage means for selectively distributing fluid pressure to each of said chambers whereby said rollers may be urged out of camming engagement with its associated cam surface.

2. An overrunning coupling comprising concentric cylindrical inner and outer races, a plurality of recesses formed in one of said races at spaced intervals, a pair of cam surfaces defined by each recess, a pair of rollers disposed in each recess, a spring situated between the rollers of each pair, said springs being adapted to urge said rollers into camming engagement with their respective cam surfaces, a pair of phasing rings, a series of piston members carried by each phasing ring, a separate piston member for one phasing ring extending into each recess on one side of one of said rollers, a separate piston member for the other phasing ring extending into each recess on one side of the other roller, said piston members cooperating with said recesses to define therewith a plurality of pressure chambers, and means for selectively distributing fluid pressure to said chambers to effect disengagement of said rollers from their respective cam surfaces to accommodate relative rotation between said coupling races in either direction.

3. An overrunning coupling comprising concentric cylindrical inner and outer coupling races, recesses formed in one of said races, a pair of juxtaposed cam surfaces defined by each of said recesses, a pair of rollers disposed in each recess, said rollers being adapted to engage said cam surfaces, a pair of piston members in each recess adjacent the associated roller, each of said piston members and a portion of each of said recesses cooperating to define a pressure chamber, and passage means for distributing fluid pressure to each chamber, the portion of said one coupling race adjacent said recess being in sliding engagement with the other race whereby one race is piloted with respect to the other.

4. An overrunning coupling comprising concentric cylindrical inner and outer races, a recess formed in the outer race, a cam surface defined by said recess, a roller disposed in said recess, said roller being adapted to engage said cam surface, a phasing ring on one axial side of said outer race, a piston member carried by said phasing ring, said piston member extending into said recess adjacent said roller and cooperating with said recess to define a pressure chamber, passage means for selectively distributing fluid pressure to said chamber whereby said piston member engages said roller and urges the same out of camming engagement with its associated cam surface to permit relative rotation between said races, and spring means for normally urging said roller into camming engagement with its associated cam surface, the portion of said one coupling race between said recesses being in sliding engagement with respect to the other.

5. An overrunning coupling comprising concentric inner and outer races, a recess formed in said outer race on the radially inward side thereof, said recess defining a pair of cam surfaces, a pair of rollers disposed in said recess, said rollers being adapted to engage said cam surfaces, a pair of phasing rings, one phasing ring being disposed on each axial side of said outer race, a separate piston member formed on each phasing ring, said piston members extending into said recess at angularly spaced locations, each piston member cooperating with said recess to define a separate pressure chamber, and means for selectively pressurizing said pressure chambers to hydraulically load said piston members whereby each of said rollers can be moved out of camming engagement with their associated cam surface, one roller being adapted to inhibit relative rotation between said races in one direction when its associated pressure chamber is exhausted and the other roller being adapted to inhibit such rotation in the opposite direction when its associated chamber is exhausted.

6. An overrunning coupling comprising concentric inner and outer races, a plurality of recesses formed in said outer races at spaced intervals on the radially inward side thereof, each of said recesses defining a pair of cam surfaces, a separator member in each recess between said races and between said cam surfaces, said separator members dividing said recesses into two parts, two series of rollers, the rollers of one series being separately disposed in one recess part of said recesses and the rollers of the other series being separately disposed in the other recess part of said recesses, each roller being adapted to engage its associated cam surface, a pair of phasing rings, one phasing ring being disposed on each axial side of said outer race, a series of piston members formed on each phasing ring, the piston members for one phasing ring extending into one recess part of each recess, the piston members for the other phasing ring extending into the other recess part of each recess, each piston member cooperating with its associated recess part to define a pressure chamber, and means for distributing fluid pressure to said pressure chambers to hydraulically load said piston members whereby said rollers can be moved out of camming engagement with their respective cam surfaces, one series of rollers being adapted to inhibit relative rotation between said races in one direction when its associated pressure chambers are exhausted and the other series of rollers being adapted to inhibit such rotation in the opposite direction when its associated pressure chambers are exhausted.

7. An overrunning coupling comprising concentric inner and outer races, a plurality of recesses formed in said outer races at spaced intervals on the radially inward side thereof, each of said recesses defining a pair of cam surfaces, a separator member in each recess between said races and between said cam surfaces, said separator members dividing said recesses into two parts, two series of rollers, the rollers of one series being separately disposed in one recess part of said recesses and the rollers of the other series being separately disposed in the other recess part of said recesses, each roller being adapted to engage its associated cam surface, a pair of phasing rings, one phasing ring being disposed on each axial side of said outer race, a series of piston member formed on each phasing ring, the piston members for one phasing ring extending into one recess part of each recess, the piston members for the other phasing ring extending into the other recess part of each recess, each piston member cooperating with its associated recess part to define a pressure chamber, and means for distributing fluid pressure to said pressure chambers to hydraulically load said piston members whereby said rollers can be moved out of camming engagement with their respective cam surfaces, one series of rollers being adapted to inhibit relative rotation between said races in one direction when its associated pressure chambers are exhausted and the other series of rollers being adapted to inhibit such rotation in the opposite direction when its associated pressure chambers are exhausted, said pressurizing means including a pair of pressure passages communicating with each recess part, one such passage being situated on each side of the associated piston member.

8. An overrunning coupling comprising concentric inner and outer races, piston means disposed between said races for transmitting torque from one race to the other, a pair of servos adapted to apply a fluid pressure force to said friction means for establishing and interrupting clutching action between said races, a separate servo of each pair being located at each peripheral side of said friction means, each servo comprising a fluid pressure chamber formed in one of said races, a piston situated in and partly defining said chamber, passage structure for distributing fluid pressure to said chambers for controlling the action of said friction means, and means in addition to said passage structure and fluid pressure for controlling the action of said friction means, a tangential component of the force on each piston acting on peripherally opposed parts of said friction means whereby free wheeling relative motion of said races in one direction, in the opposite direction and in both directions may be accomplished selectively depending upon the pressure distribution to said chambers.

9. An overrunning coupling comprising concentric inner and outer races, friction means disposed between said races for transmitting torque from one race to the other, a pair of servos adapted to apply a fluid pressure force to said friction means for establishing and interrupting clutching action between said races, a separate servo of each pair being located at each peripheral side of said friction means, each servo comprising a fluid pressure chamber formed in one of said races, a piston situated in and partly defining said chamber, passage structure for controlling the action of said friction means, and means in addition to said passage structure and fluid pressure for controlling the action of said friction means, said friction means being adapted to engage frictionally said races, and under the influence of fluid pressure in said chambers freewheeling relative motion of said races in one direction, in the opposite direction and in both directions may be accomplished selectively depending upon the pressure distribution to said chambers.

References Cited in the file of this patent

UNITED STATES PATENTS

| | | |
|---|---|---|
| 1,782,605 | Farley | Nov. 25, 1930 |
| 1,807,035 | Herman | May 26, 1931 |
| 2,001,668 | Maier | May 14, 1935 |
| 2,504,481 | Zingsheim | Apr. 18, 1950 |

UNITED STATES PATENT OFFICE
CERTIFICATE OF CORRECTION

Patent No. 3,084,774                                                         April 9, 1963

Po-lung Liang

It is hereby certified that error appears in the above numbered patent requiring correction and that the said Letters Patent should read as corrected below.

Column 8, line 8, for "piston" read -- friction --.

Signed and sealed this 31st day of March 1964.

(SEAL)
Attest:

ERNEST W. SWIDER                                       EDWARD J. BRENNER

Attesting Officer                                         Commissioner of Patents